INVENTOR.
GEDDES ALAN BRAY
BY
Martin D. Wittstein
ATTORNEY

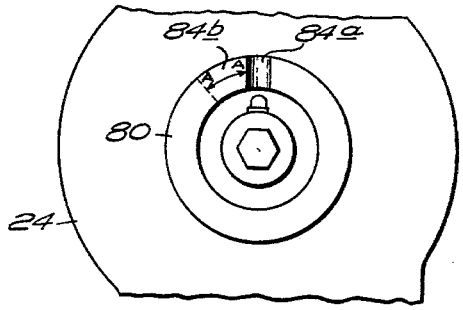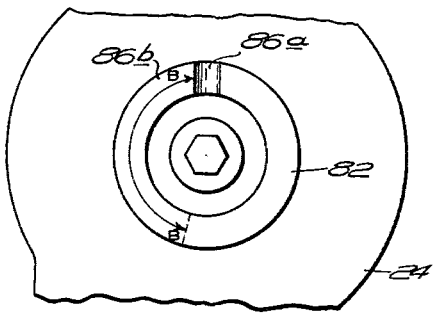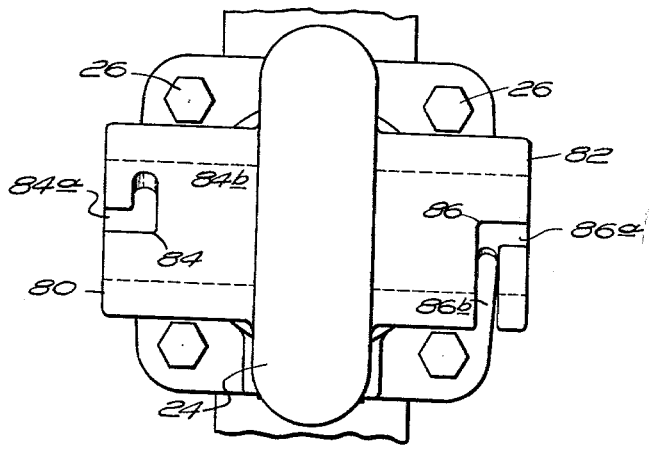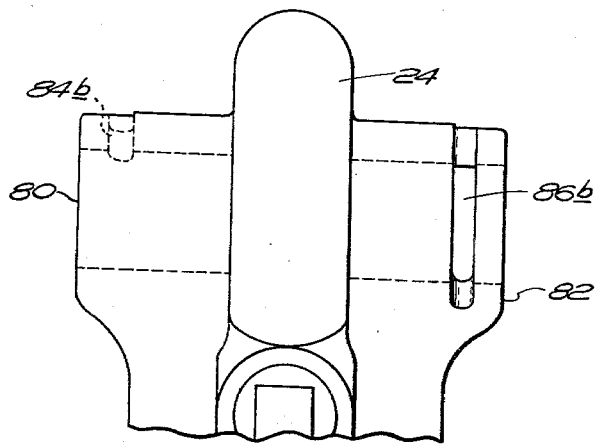
INVENTOR.
GEDDES ALAN BRAY

INVENTOR.
GEDDES ALAN BRAY

United States Patent Office 3,174,717
Patented Mar. 23, 1965

3,174,717
RATCHET ACTUATED FAST-OPENING,
SLOW-CLOSING VALVE
Geddes Alan Bray, Moston, Manchester, England, assignor to Grinnell Corporation, Providence, R.I., a corporation of Delaware
Filed Dec. 7, 1961, Ser. No. 157,687
4 Claims. (Cl. 251—230)

This invention relates generally to fluid flow control valves for use in fire protection systems. More particularly, the invention relates to a substantially tamper proof valve for use in a high pressure water line supplying water for fire protection purposes, and is designed and constructed such that it can be quickly opened when an emergency arises but can only be closed slowly thereby preventing water hammer in the line.

Effective fire protection installations depend in great measure upon the provision of a large volume of water being supplied at high pressure, and the availability of this water in the shortest possible time. This means that any flow control valve installed in a fire protection water line must be of the quick opening type so the required volume of water at the necessary pressure will be delivered immediately when the need arises. A valve of this type is called a deluge valve, and there are many different types commercially available which have enjoyed varied degrees of success.

The problem that arises, however, is that most water authorities do not permit the use of quick opening valves in high pressure lines which are also quick closing because of the probability of water hammer in the line if the valve is closed too rapidly. Water hammer results from shock waves created by the sudden arresting of movement of the water, which waves travel through the line with tremendous speed and force to the water source and then rebound back to the arresting point. It is apparent to one skilled in the art that such shock waves create undesirable stresses on the pipe or conduit which can cause damage to critical sections thereof such as fittings and connections, or even burst the conduit itself.

To obviate this condition, it is the established practice, and a requirement of fire protection codes, to insert in the line between the deluge valve and the water source a slow closing usually manually operated valve which must be closed prior to the closing of the deluge valve. Frequently the deluge valve is so constructed that it cannot be closed while water is passing therethrough; hence the slow closing valve must be actuated to stop the flow of water before the deluge valve can be closed. This approach to the problem, while successful, suffers the inherent disadvantage of requiring multiple valves, one normally closed for quick opening and the other normally open for slow closing, thus adding to the cost of installation and entailing additional maintenance. Further, as a safety precaution, equipment is necessary to assure that the normally open, slow closing valve is not closed or otherwise tampered with at improper times or by unauthorized persons which action would impair or completely nullify the effectiveness of the fire protection system.

The present invention is directed to the provision of a flow control valve having the features of quick opening and slow closing incorporated into a single unitary substatially tamper proof valve structure, thereby eliminating the aforementioned problems of plural valving. Such a structure is characterized by having a housing through which the line water passes, and a flow blocking element therein which is movable form a normally closed flow blocking position to an open position permitting full flow. The structure is further characterized by having an actuating mechanism for the flow blocking element which is operable in one direction of movement at one speed to permit rapid opening of the valve, but is operable in the opposite direction of movement only at a much slower speed to prevent quick closing of the valve.

The principles of this invention are herein illustratively incorporated into a valve of the diaphragm type having a housing which defines a flow passageway therethrough with inlet and outlet ends, a weir or dam located within the housing intermediate the aforementioned ends, and a resilient diaphragm clamped between the housing and a bonnet mounted thereon, the diaphragm being movable from a position of forceable engagement with the weir to block movement of water through the flow passageway to a position remote from the weir which permits full flow of water through the valve housing. The aforementioned bonnet encloses the actuating mechanism for the diaphragm, which mechanism comprises a pressing member or compressor, a connecting rod for the compressor, and actuating mechanism for the connecting rod in the form of an eccentric which, when operated, will move the diaphragm from its closed to its full open position by turning through approximately one half of a revolution, or about 180°: the eccentric shaft terminates in oppositely facing shaped extensions which are alternately received in the correspondingly shaped socket of a ratchet lever which is insertable through appropriate slots formed in opposite sides of the bonnet. One such slot permits the ratchet lever to turn through an arc of about 180°, and accordingly is the valve opening slot; the other valve closing slot permits the ratchet key to turn through a much smaller arc, in the nature of 30°, which therefore requires six movements of the ratchet key to return the diaphragm to its closed position. It therefore takes approximately six times as long to close the valve as it does to open it.

Having briefly described an illustrative form of the present invention, a primary object thereof is the provision of a flow control valve for a high pressure water line which is quick opening but slow closing, thereby preventing water hammer in the line.

Another object of the present invention is the provision of a flow control valve for a high pressure water line which can be opened quickly when the need therefor arises, but which can only be closed slowly to prevent the creation of shock waves in the line.

Still another object of the present invention is the provision of a flow control valve for a high pressure water line which is quick opening but which can only be closed slowly, in which the same valve actuating mechanism is operated in the same manner in both directions of movement but at different speeds to prevent quick closing of the valve.

Still another object of the present invention is the provision of a flow control valve for use in a high pressure water line which is quick opening but can only be closed slowly, and which is actuated by an element inserted through a portion of the housing, thereby preventing unauthorized tampering with the valve by persons not in possession of the required element.

Still another object of the present invention is the provision of a flow control valve for a high pressure water line which is economical to manufacture, simple to install, requires a minimum of maintenance and has a high degree of reliability.

In the drawings, in which the same reference numerals are used throughout the various parts to indicate like parts:

FIGURE 3 is a fragmentary left elevational view of the bonnet as seen in FIG. 2;

FIGURE 4 is a fragmentary right elevational view of the bonnet as seen in FIG. 2;

FIGURE 5 is a fragmentary plan view of the bonnet as seen in FIG. 2;

FIGURE 6 is a fragmentary front elevation of the bonnet as viewed in FIG. 2;

Figure 1:
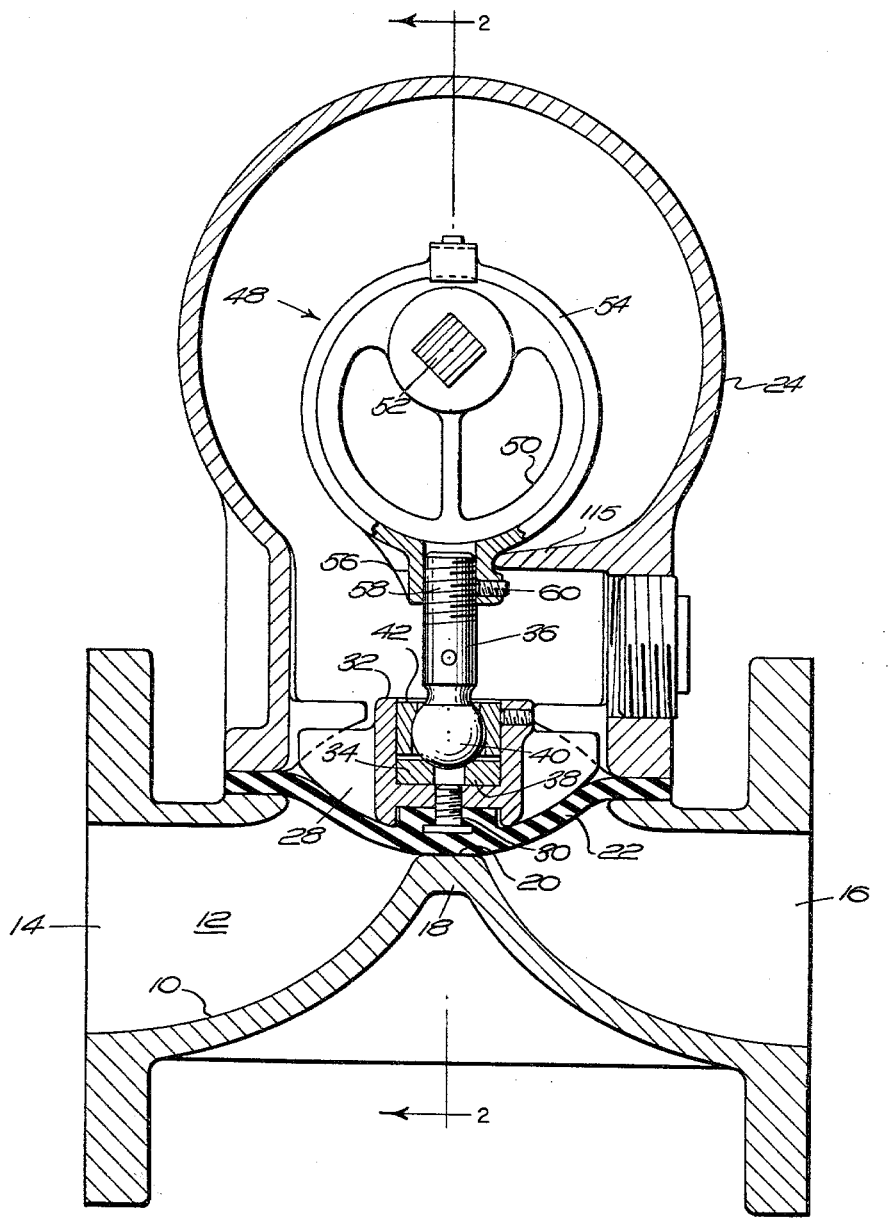
FIGURE 1 is a side sectional view taken on a vertical plane passing through the longitudinal axis of the valve body, showing the parts in their valve closed position.

Referring now to the drawings, and more particularly to FIG. 1, the valve of this invention is seen to comprise a generally tubular housing 10 defining a flow passage 12 therethrough and having an inlet end 14 and an outlet end 16. Intermediate these ends, one side of the housing is deformed inwardly to provide a weir or dam 18 over which the water must flow in passing through the housing. The inner surface of the weir is shaped to provide a seat for a resilient diaphragm 22 fabricated from rubber, plastic or a combination of both, which is forcibly pressed against the seat by mechanism to be hereinafter described, and which, when so pressed, blocks the passage of water through the housing. The diaphragm 22 is clamped between a portion of the housing 10 and a bonnet 24 by means of bolts 26 to prevent the escape of water either to the outside of the housing or into the bonnet 24.

Figure 2:
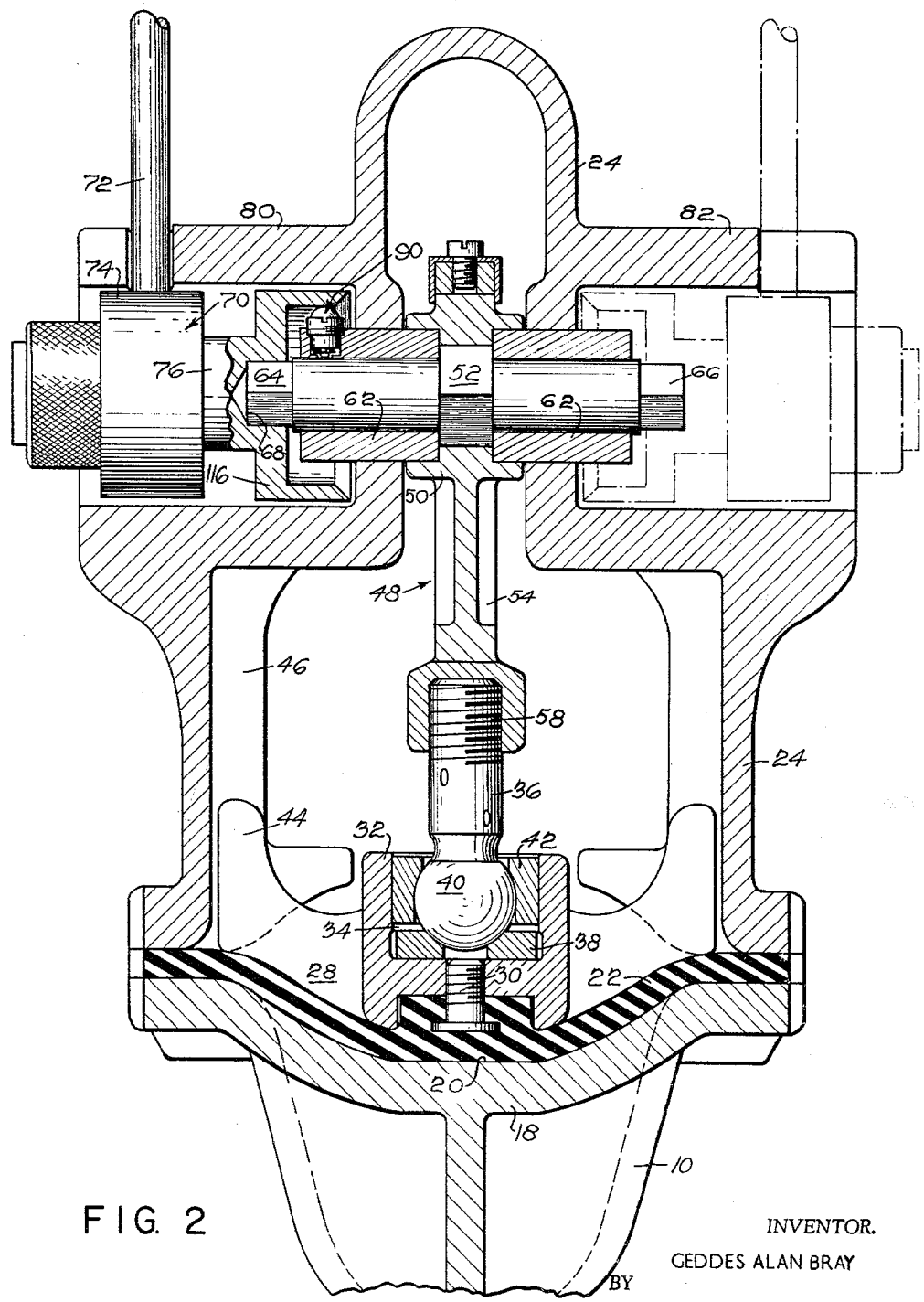
FIGURE 2 is a sectional view taken on the line 2—2 of FIG. 1.

The actuating mechanism for the valve is all contained within the bonnet, and is seen in FIGS. 1 and 2 to comprise a pressing member or compressor 28 to which the diaphragm 22 is secured by a stud 30 which has a head portion embedded in a thickened central portion of the diaphragm 22 and a shank portion threadedly engaged with the compressor 28. Thus the compressor will move the diaphragm in both push and pull directions. The compressor further has a medial surface which is contoured to correspond in shape with the seating surface 20 of the weir 18 so that the diaphragm 22 will provide an effective seal when the valve is in its closed position.

The compressor is provided with an upwardly extending boss 32 which is hollowed out to provide a chamber 34 for receiving one end of a connecting rod 36 which, by mechanism yet to be described, will drive the compressor toward and away from the weir 18. An annular plug 38 in the bottom of the chamber 34 provides a seat for the ball end 40 of the connecting rod. The ball 40 is secured within the chamber by a retaining nut 42 which is threadedly engaged with the chamber walls. The ball 40 and socket formed by seating plug 38 and retaining nut 42 constitute a universal joint connection between the connecting rod 36 and the compressor 28.

The connecting rod is driven in a reciprocatory manner by an eccentric, generally designated by the numeral 48 which consists of an eccentric disk 50 fixedly mounted on an eccentric shaft 52 for rotation therewith, and which is journaled within an eccentric strap 54 for movement relative thereto. The eccentric strap has a hollow boss 56 protruding from one portion of the periphery thereof which is internally threaded to receive the threaded end 58 of the connecting rod 36. A set screw 60 prevents rotation of the connecting rod 36 within the eccentric strap boss 56 once the desired connection has been made. The eccentric shaft 52 is journaled for rotation in bearings 62 mounted in opposite sides of the bonnet.

The compressor is guided for vertical motion within the bonnet 24 by means of guide extensions 44 formed on the compressor 28 which slide in grooves 46 formed on the inside surface of the bonnet wall.

The operation of the valve as thus far described is as follows: With the parts as shown in FIG. 1, rotation of the eccentric shaft 52 in a clockwise direction by means yet to be described causes rotation of the eccentric disk 50 about the axis of the eccentric shaft 52 which in turn causes the eccentric strap 54 to move upwardly in a curved path. Because of the universal connection between the connecting rod 36 and compressor 28, the threaded end 58 of the connecting rod 36 can follow the path of the eccentric strap boss 56 while the ball end 40 moves in a linear path to drive the compressor 28 upwardly, drawing the diaphragm 22 therewith to open the valve. To close the valve, the eccentric shaft 52 is turned in a counter-clockwise direction to reverse the rotation of the above parts.

Referring now to FIG. 2, the eccentric shaft 52 is seen to terminate outwardly in shaped ends or extensions 64 and 66 which are adapted to be received within a correspondingly shaped socket 68 of a one way drive ratchet lever 70. The ratchet lever 70 comprises an elongate handle portion 72 and a ratchet head 74, the head containing a short shaft 76 rotatably mounted therein and having a plurality of teeth (not shown) thereon. A pivoted pawl (not shown) is also mounted within the head 74 and is spring biased into engagement with the teeth. Thus, when the shaft 76 is engaged with the eccentric shaft 52 through the aforementioned connection, the handle 72 can be oscillated back and forth about the axis of shaft 76 to drive shaft 76 and the eccentric shaft 52 in one direction of rotation. The eccentric shaft 52 will be driven in one direction or the other depending upon which of the extensions 64 or 66 is engaged by the ratchet lever 70.

Referring again to FIG. 2 and to FIGS. 3–6, the bonnet 24 is seen to have a pair of protruding hollow bosses 80 and 82 which are respectively aligned with the eccentric shaft shaped extensions 64 and 66, the bosses 80 and 82 acting as guides for the engagement of the ratchet lever with the shaft extensions 64 and 66 and also for the reciprocating movements of the handle 72. Each boss 80 and 82 has an L-shaped slot 84 and 86 respectively formed therein, each slot having a longitudinal portion 84a and 86a and a peripheral portion 84b and 86b. As the head 74 of the ratchet lever 70 is inserted into one of the bosses 80 or 82 to engage one of the eccentric shaft extensions 64 or 66, the handle 72 will first pass longitudinally through the slot portion 84a or 86a until the connection is completed, whereupon the handle 72 can be moved through the peripheral slot portions 84b or 86b so as to oscillate about the axis of the ratchet head 74. Recalling from above that the ratchet lever has a one-way drive, it can be seen that movement of the handle 72 in the peripheral slot portions 84b or 86b in one direction will drive the eccentric shaft, and movement of the handle 72 is the opposite direction will have no effect on the eccentric shaft, but will merely cause the ratchet to override its teeth.

In order to permit the valve to be opened quickly and to prevent it from being closed quickly, it will be seen from FIGS. 3–6 that the peripheral groove 86b extends around the boss 82 for substantially one half of a revolution, or almost 180°; therefore, when the ratchet lever 70 is inserted into the boss 82 and engaged with the eccentric shaft extension 66, the handle 72 can be rotated through the length of peripheral groove portion 86b or almost one half of a turn. Because of the aforementioned eccentric which causes the diaphragm to move from its closed position to its open position upon one half of a revolution of the eccentric shaft 52, a corresponding movement of the ratchet handle 72 will move the valve actuating mechanism and the diaphragm from its normally closed position to a full open position in only the time required to swing the handle 72 through this arc.

The peripheral groove portion 84b however, is only approximately one sixth the length of the peripheral slot portion 86b, or about 30°; hence, the rotary movement of the handle 72 when the ratchet 70 is inserted into the boss 80 is limited to this arc. Consequently, when the ratchet lever is engaged with the eccentric shaft extension 64 and moved in a driving direction, the eccentric shaft 52 will be rotated only sufficiently far to move the actuating mechanism and diaphragm 22 from their full open position to a position of about five sixths open. The handle 72 will then have reached the end of the peripheral slot portion 84b and must be returned through this portion to commence another driving stroke. A second movement of the handle 72 through the arc of slot portion 84b will move the actuating machanism and diaphragm 22 another one sixth of its total movement to a position of about two thirds open, and so on until the valve is closed. It will thus be apparent that it will require six such driving strokes of the handle 72 to close the valve, which, with ordinary operation of the ratchet lever 70, will require approximately six times the length of time to close the valve as to open it.

In order to prevent the diaphragm 22 and valve actuating mechanism from following the ratchet lever on the latter's return movement after the lever has made its first closing stroke and hence returning to its full open position due to line pressure acting on the diaphragm, a non-return locking mechanism 90 is provided which is automatically engageable when the ratchet lever 70 is inserted into the valve closing side of the bonnet 24.

Figures 7, 8:
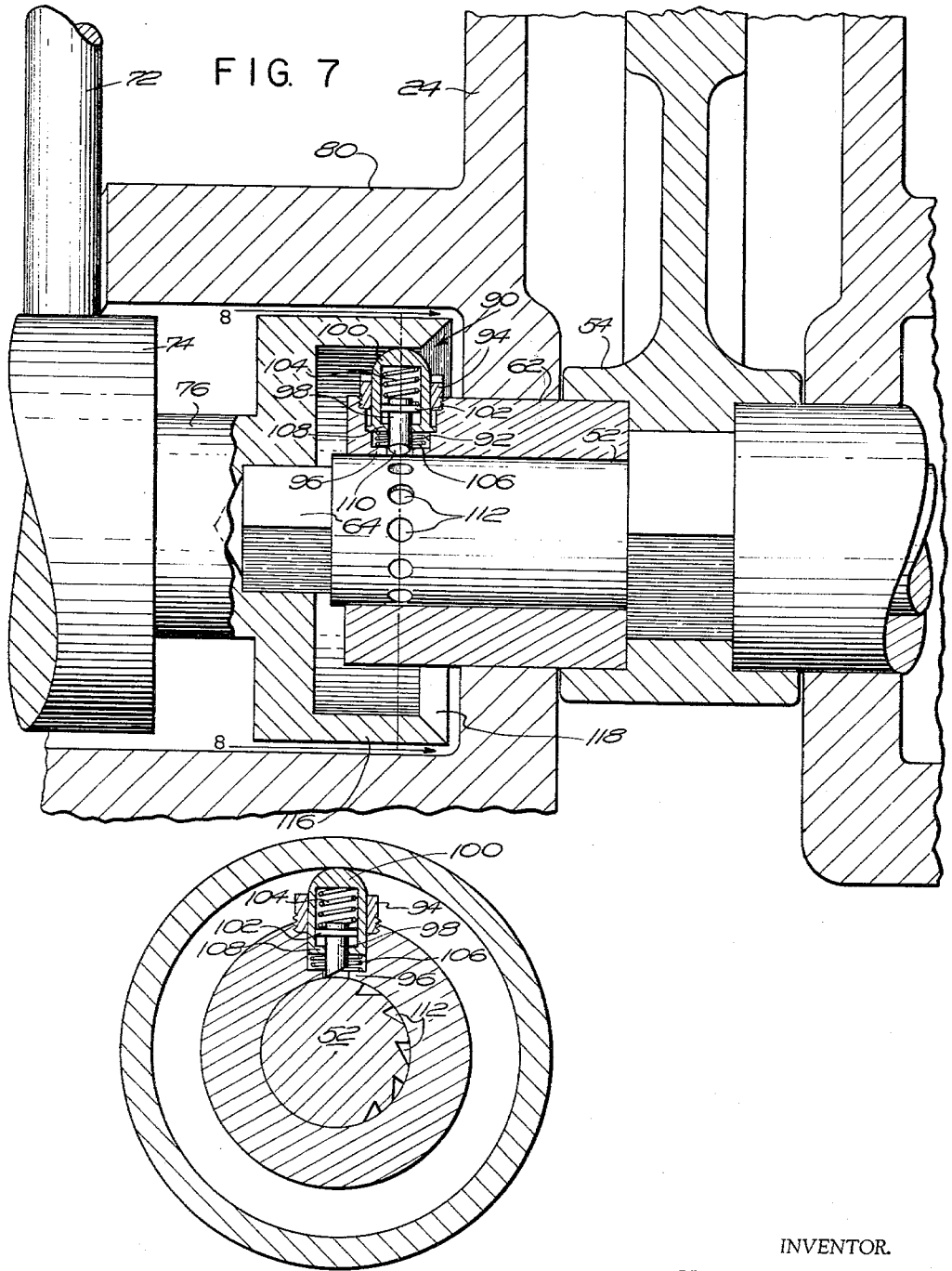
FIGURE 7 is a fragmentary view of the non-return locking mechanism shown in FIG. 2 but on a larger scale.
FIGURE 8 is a sectional view taken on the line 8—8 of FIG. 7.

Referring to FIGS. 7 and 8, the eccentric shaft bearing 62 is seen to have a bore 92 therethrough which is counterbored into three different portions, the upper largest portion threadedly receiving a sleeve 94 having an internal diameter equal to the middle portion of the bore 92 to form an extension thereof. The smallest portion is defined by an annular ring 96 which acts as one guide for a pin 98 which is slidably mounted in a casing 100 and which has an annular flange 102 adjacent its lower end. The flange 102 acts as another guide for the pin 98. Captured between the flange 102 and the upper end of the casing is a compression spring 104 which urges the pin 98 downwardly toward the eccentric shaft 52. Another compression spring 106 captured between the annular ring 96 and a flange 108 on the bottom of the casing 100 constantly urges the latter upwardly or outwardly of the eccentric shaft bearing 62. The pin 98 terminates at its other end in a dog 110 adapted to engage in recesses 112 formed in the peripheral surface of the eccentric shaft 52 during the closing movement of the actuating mechanism. The recesses 112 are positioned around the periphery of the eccentric shaft 52 in spaced relationship corresponding to the length of the peripheral slot portion 84b so that the dog 110 will drop into successive recesses as the shaft is moved through the arc permitted by the movement of ratchet handle 72 in the peripheral slot portion 84b. The dog 110, being biased downwardly by the spring 104 will prevent the shaft 52 from turning in the direction of valve opening in response to line pressure on the diaphragm 22.

It will be noted that there are only five recesses 112 since, when the valve is in its fully closed position, the eccentric has moved slightly past the bottom dead center position and is resting on the stop 115 (FIG. 1). Hence, no recess 112 is required to maintain the shaft 52 in this position.

The non-return locking mechanism 90 is brought into engagement by a sleeve 116 formed integrally with the ratchet lever shaft 76 and which has a camming surface 118 which engages the rounded top of the casing 100 as the ratchet lever 70 is inserted into the boss 80. The surface 118 cams the casing 100 downwardly against the action of spring 106 to permit the dog 110 to rest on the peripheral surface of the eccentric shaft 52 and to drop into the recesses 112 as the shaft 52 rotates. Withdrawal of the ratchet lever 70 from the boss 80 permits the spring 106 to urge the casing 100 upwardly thereby causing the flange 108 to engage the flange 102 to withdraw the dog 110 from contact with the shaft 52.

It will be apparent from the foregoing description that there has been provided a quick opening slow closing valve which is believed to provide a solution to the problems, and to fulfill the objectives, hereinbefore set forth. it is to be understood, however, that the above description and accompanying drawings are to be deemed primarily as illustrative of the best mode presently contemplated of carrying out the principles of the invention, and that the device described and illustrated may be modified or altered in its form, proportions, detail of construction and arrangement of parts without departing from the spirit and scope of the invention as defined in the appended claims.

What I claim and desire to secure by Letters Patent is:
1. A quick opening slow closing valve comprising:
   (a) a valve housing defining a flow passageway therethrough,
   (b) a valve seat in said housing,
   (c) a valve element movably mounted in said housing for movement between a first position wherein said valve element engages said seat to block said flow passageway and a second position wherein said valve element is spaced from said seat to open said flow passageway,
   (d) actuating mechanism alternately operable through a range of movement in opposite directions for moving said valve element between said first and second positions,
   (e) reciprocative means movable through a first path of travel for moving said actuating mechanism through said range of movement to move said valve element between said first position and said second positions, and movable through a second path of travel in steps for moving said actuating mechanism through said range of movement to move said valve element from said second position to said first position, and
   (f) means defining said first and second paths of travel of said reciprocative means,
      (1) said first path of travel being of a length great enough to permit said moving means to move said actuating means through said range of movement while said moving means travels in one direction only,
      (2) said second path of travel being of a length that is only a fractional part of the length of said first path of travel, thereby requiring said reciprocative means to reciprocate through said second path of travel a plurality of times to move said actuating mechanism through said range of movement,
whereby more time is required to move said valve element from said second position to said first position than is required to move said valve element from said first position to said second position when the reciprocative means is moved at the same rate in opposite directions.

2. The apparatus as set forth in claim 1 wherein said actuating mechanism comprises:
   (a) a support mounted on said valve housing,
   (b) a shaft rotatably mounted in said support, and
   (c) means interconnecting said shaft with said valve element whereby said valve element moves in response to rotation of said shaft.

3. The apparatus as set forth in claim 2 wherein said reciprocative means comprises:
   (a) a lever having a driving member alternatively engageable with opposite ends of said shaft,
   (b) a handle portion for rotating said driving member, and
   (c) one way drive means operably associated with said lever for causing said driving member to rotate upon rotation of said handle in one direction and for permitting said driving member to remain stationary upon rotation of said handle in the opposite direction.

4. The apparatus as set forth in claim 3 wherein said first and second path defining means comprises:
(a) a first guide surrounding one end of said shaft, said first guide having a slot therein which slidably receives said handle portion of said lever as said handle portion is rotated to drive said driving member, said slot being equal in length to said first path of travel, and
(b) a second guide surrounding the opposite end of said shaft, said second guide having a slot therein which is equal in length to said second path of travel.

References Cited in the file of this patent
UNITED STATES PATENTS

| | | |
|---|---|---|
| 1,066,125 | Leming | July 1, 1913 |
| 2,527,420 | Henwood | Oct. 24, 1950 |
| 2,745,290 | Klein et al. | May 15, 1956 |
| 2,936,998 | Loepsinger | May 17, 1960 |
| 3,061,264 | Rupert | Oct. 30, 1962 |

FOREIGN PATENTS

| | | |
|---|---|---|
| 517,887 | Great Britain | Feb. 12, 1940 |
| 105,995 | Switzerland | Oct. 24, 1923 |